(12) United States Patent
Guenther et al.

(10) Patent No.: US 6,266,183 B1
(45) Date of Patent: Jul. 24, 2001

(54) SELF-CENTERING CRASH PROTECTION MECHANISM FOR INTERFERENCE MICROSCOPE OBJECTIVE

(75) Inventors: Bryan W. Guenther, Tucson, AZ (US); David J. Aziz, Sunnyvale, CA (US)

(73) Assignee: Veeco Instruments Inc., Tucson, AZ (US)

( * ) Notice: Subject to any disclaimer, the term of this patent is extended or adjusted under 35 U.S.C. 154(b) by 0 days.

(21) Appl. No.: 09/664,141

(22) Filed: Sep. 18, 2000

(51) Int. Cl.[7] .............................. G01B 21/00; H01H 3/16
(52) U.S. Cl. ..................... 359/383; 359/368; 359/382; 200/47
(58) Field of Search ..................... 359/368–370, 359/379–382, 391–393, 656–661, 694, 703, 704, 815, 817–822

(56) References Cited

U.S. PATENT DOCUMENTS

| 87,012 | * | 2/1869 | Thompson | 359/399 |
|---|---|---|---|---|
| 3,762,881 | * | 10/1973 | Dunn | 29/191 |
| 4,364,687 | * | 12/1982 | Adell | 403/370 |
| 5,108,013 | * | 4/1992 | VanBrocklin | 222/321 |
| 5,315,080 | * | 5/1994 | Kaczynski et al. | 200/47 |
| 5,764,409 | * | 6/1998 | Colvin | 359/382 |

FOREIGN PATENT DOCUMENTS 34 02 583 * 1/1985 (DE) ..................... 359/819

* cited by examiner

Primary Examiner—Thong Nguyen
(74) Attorney, Agent, or Firm—Antonio R. Durando

(57) ABSTRACT

A crash protection mechanism for a microscope objective includes a tapered, self-centering combination of sleeves interposed between the objective and its housing in an interferometric profiler. A three-lobed, tapered inner sleeve is affixed to the objective, while a matingly tapered outer sleeve is attached to the objective housing. A spring-loaded mechanism urges the objective outward toward the sample surface, so that it can move inward axially under crash conditions and then return to its original axial position. The mating tapered sleeves create an outward seated position that provides a high degree of repeatability when the objective is returned to its position after a crash.

14 Claims, 9 Drawing Sheets

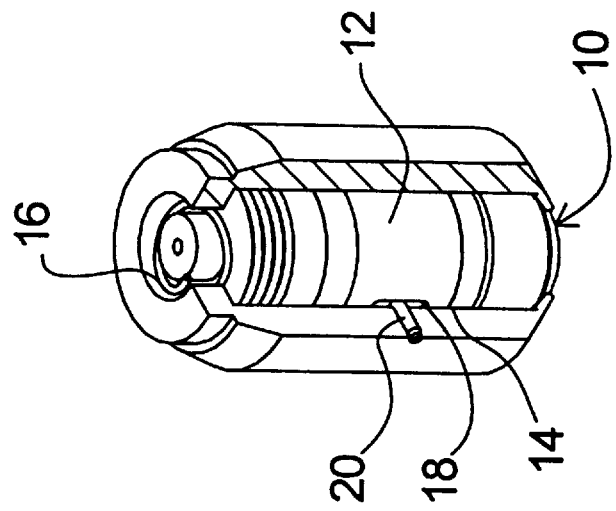
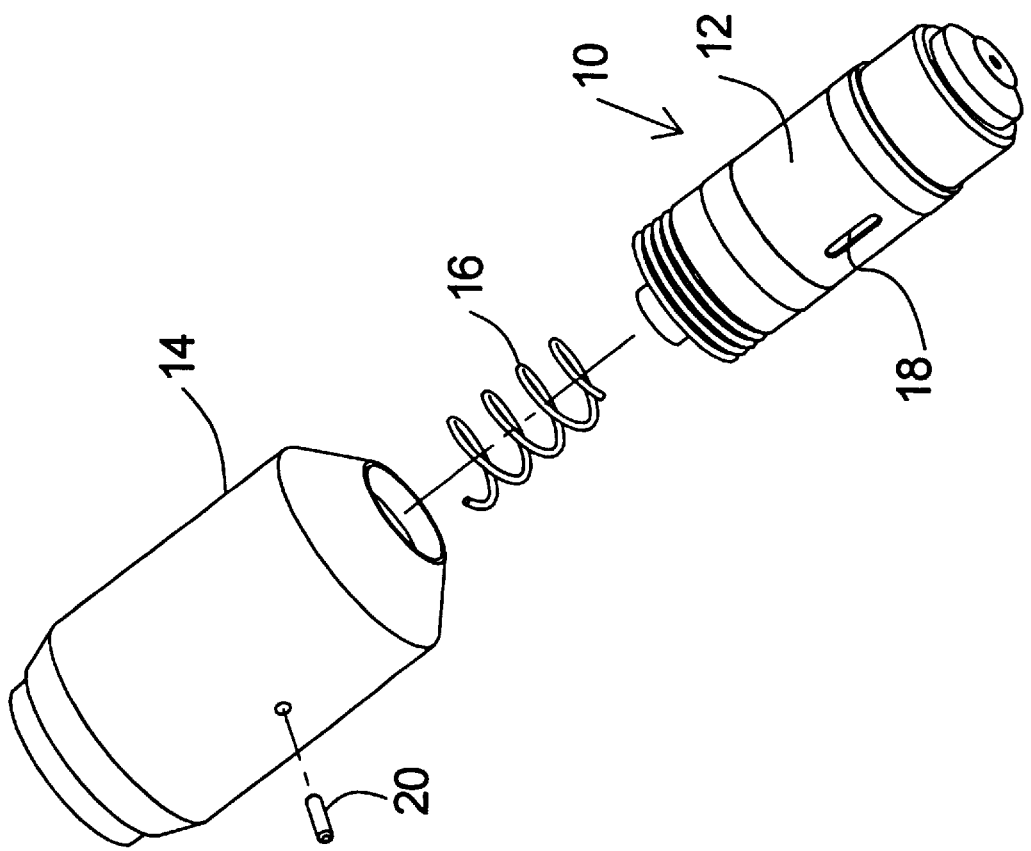

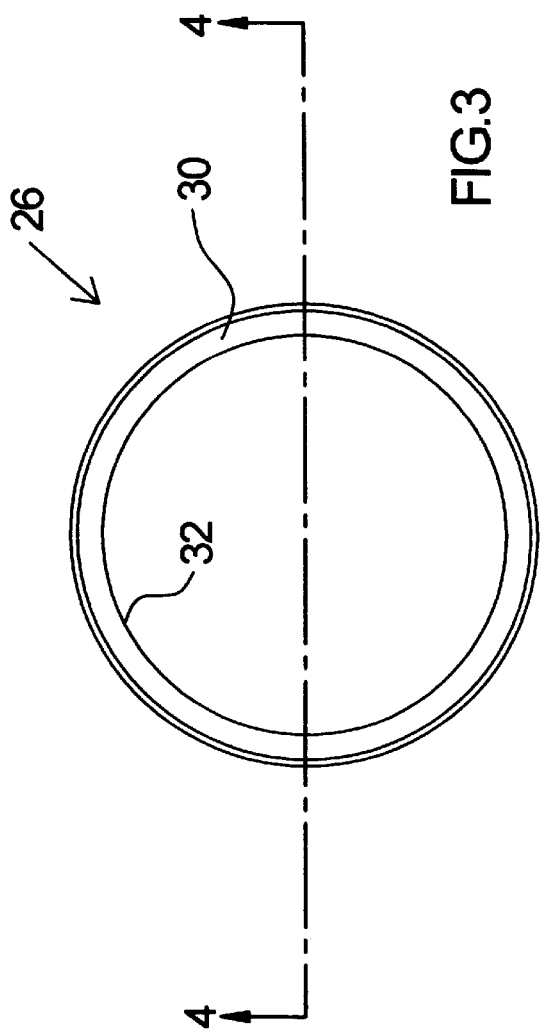
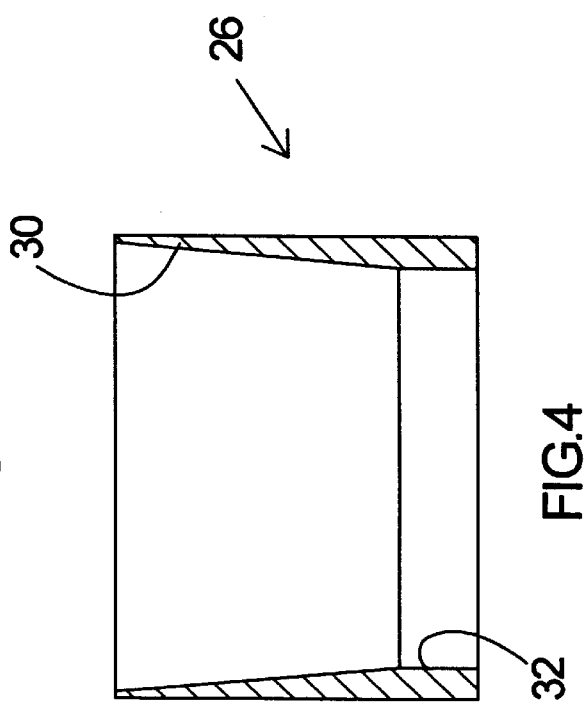

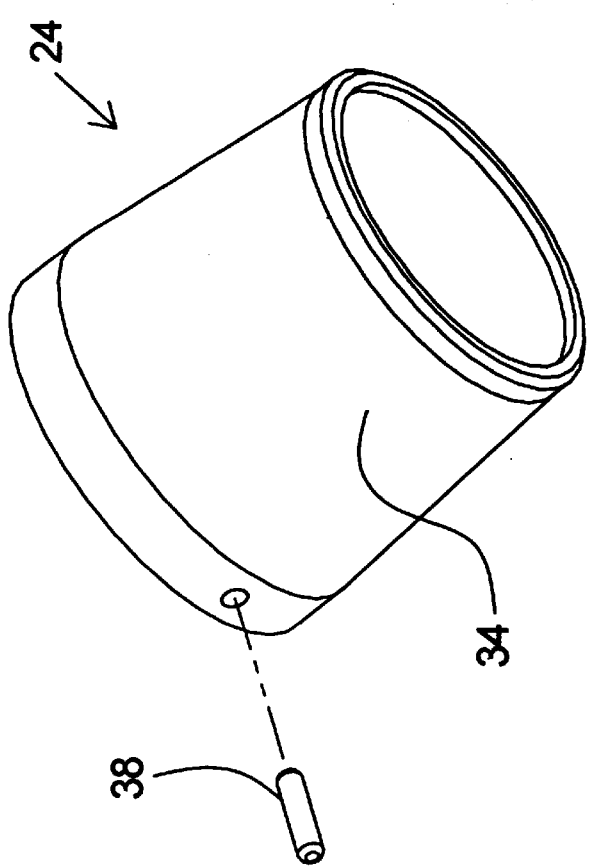
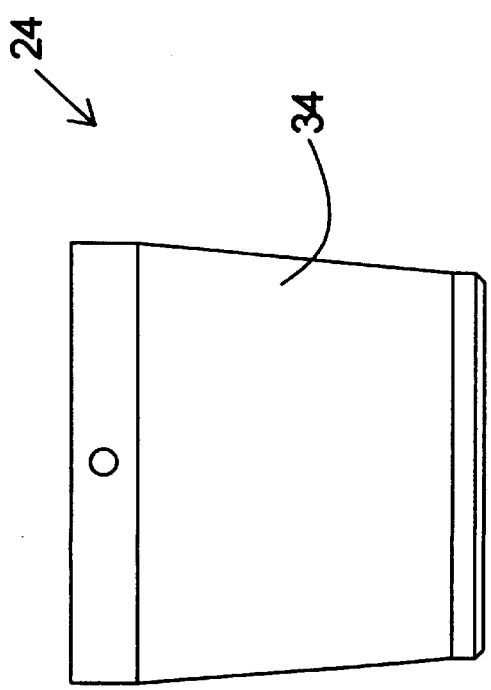
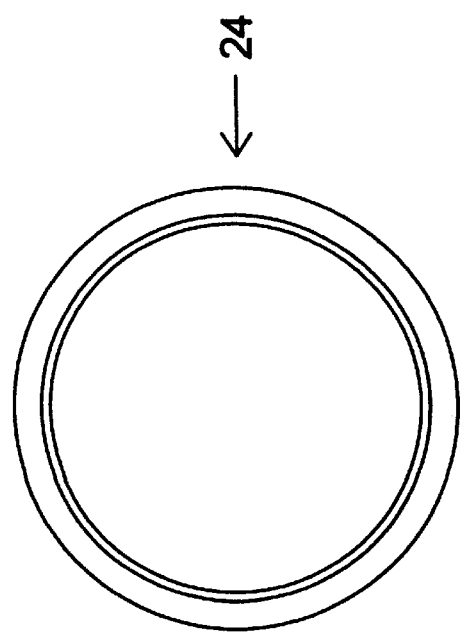

SELF-CENTERING CRASH PROTECTION MECHANISM FOR INTERFERENCE MICROSCOPE OBJECTIVE

BACKGROUND OF THE INVENTION

1. Field of the Invention

This invention is related in general to the field of interferometry and, in particular, to a novel self-centering mechanism for crash protection of interference microscope objectives.

2. Description of the Related Art

Interferometers used in surface profilometry utilize a microscope objective facing a sample surface mounted on a stage. These microscope objectives typically produce magnifications in the 1.5× to 100× range. Earlier designs operated at finite conjugates, in which case a real image is formed at a known, typically constant, distance from the objective. Most current microscope objectives operate at infinite conjugates, in which case a tube lens with a specific reference focal length (for example, 200 mm for Nikon and Leica, 180 mm for Olympus, and 164.5 mm for Zeiss objectives) is used in conjunction with the objective to form a real image. Infinite conjugate objectives have a focal length that varies inversely with the magnification (power) according to the relation $f_{objective} = f_{Reference}/\text{power}$. For example, a 50× Nikon objective has a focal length of 4 mm; a 20× Nikon objective of 10 mm; and so on. Very high magnification objectives have correspondingly short focal lengths, as well as very short working distances. The working distance of a microscope objective (or other lens) is the distance from the objective to the mechanical surface closest to the objective. A typical working distance for a 100×-magnification achromatic objective is approximately 0.3 mm.

As a result of such short working distances, the process of focusing with high magnification objectives always carries the possibility that the objective may contact the sample (a very undesirable event referred to as "crashing" in the art). In order to protect the objective's optical components from damage when a crash occurs, manufacturers typically incorporate the objective with a spring-loaded mechanism that allows the axial motion of the objective away from the sample surface when upward pressure is applied upon contact. As illustrated in FIGS. 1A and 1B, the operational components of such conventional mechanisms consist of two cylindrical surfaces providing a telescopic coupling between the objective and its housing. The objective 10 includes a cylindrical inner sleeve 12 that is adapted for relative axial motion within the conforming inner surface of the housing 14 of the microscope (which thus functions as an outer sleeve for the inner sleeve 12). The microscope objective 10 is urged forward by a spring 16 along the optical axis of the objective (i.e., its longitudinal axis). Thus, the objective is free to move inward when pushed as a result of an impact with a sample and is able to return to its original forward position upon release. A travel slot 18 and a pin 20 are used to prevent the objective 10 from rotating relative to the housing for the assembly.

The cylindrical connection between the inner sleeve and the housing of the crash protection mechanism necessarily includes a gap between the abutting surfaces of the two parts which may allow the position of the objective to shift in a radial direction. This gap, due in part to tolerances of manufacture and in part to the clearance necessary to permit the substantially frictionless axial translation of the objective, may produce misalignments whenever a crash occurs even though the objective is returned to its original axial position. Such radial shifts are often sufficient to cause measurement errors or require recalibration of other portions of the objective, especially in Linnik-interferometric applications.

Accordingly, there is still a need for a mechanism that protects a high-power interference objective from crash damage and that, in addition, prevents the radial shifting of the objective upon release from contact with the sample surface. This invention is directed at providing a novel approach to that end.

BRIEF SUMMARY OF THE INVENTION

The primary goal of this invention is a crash protection mechanism that prevents radial shifting of the interference objective after a crash with a sample surface.

Another objective of the invention is an approach that is particularly suitable for implementation in a Linnik interferometric arrangement.

Finally, a goal of the invention is a mechanism that is suitable for implementation with relatively minor modifications to existing interference microscope objectives and interferometric surface profilers.

Therefore, according to these and other objectives, the invention consists of a tapered, self-centering combination of sleeves interposed between the objective and its housing in an interferometric profiler. A three-lobed, tapered inner sleeve is affixed to the objective, while a matingly tapered outer sleeve is attached to the objective housing. A spring-loaded mechanism urges the objective outward toward the sample surface, so that it can move inward axially under crash conditions and then return to its original axial position. The mating tapered sleeves create an outward seated position that provides a high degree of repeatability when the objective is returned to its position after a crash.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1A is an exploded view of a prior-art crash prevention mechanism comprising an inner, spring-loaded objective mounted in a concentric outer cylindrical sleeve, whereby the microscope objective is axially displaceable with respect to the outer sleeve by a force acting on the objective.

FIG. 1B is a cut-out view of the microscope objective components of FIG. 1A assembled into a working unit.

FIG. 3 is a top view of the outer sleeve of the invention.

FIG. 4 is a sectioned view of the outer sleeve of FIG. 3 as seen from line 4—4 in that figure.

FIG. 5 is a perspective view of the inner sleeve of the invention.

FIG. 6 is a top view of the inner sleeve of FIG. 5.

FIG. 7 is an elevational view of the inner sleeve of FIG. 5.

DESCRIPTION OF THE PREFERRED EMBODIMENTS OF THE INVENTION

Figure 2:
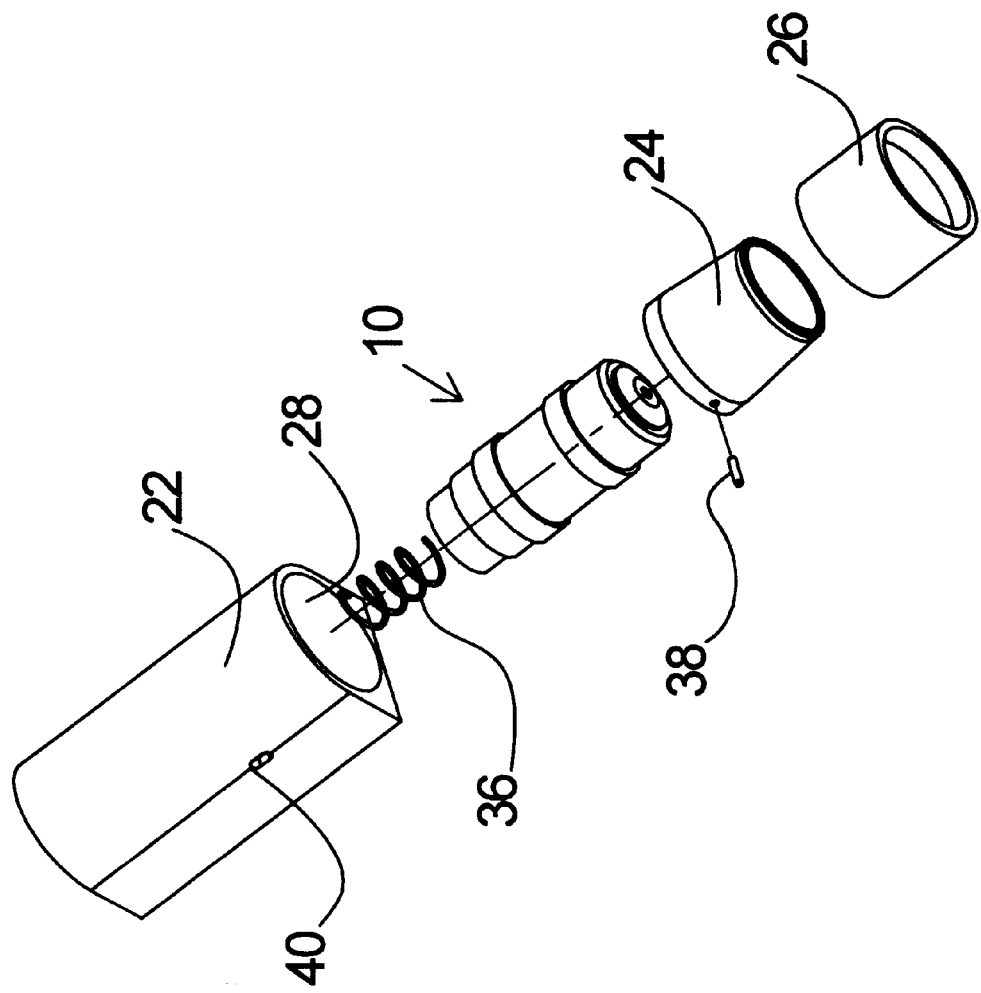
FIG. 2 is an exploded view of a microscope objective including the elements of the present invention.

The essence of this invention is the realization that the misalignments caused by lateral shifts in prior-art crash protection mechanism can be avoided by providing a precisely mating tapered configuration in the abutting surfaces of the inner and outer sleeves of the device. As shown in exploded view in FIG. 2, an embodiment of the invention consists of a conventional microscope objective 10 mounted in a housing 22 by means of a pair of concentric sleeves that constitute the crash mechanism of the invention. An inner sleeve 24 is adapted to rigidly support the objective 10 in conventional manner, while an outer sleeve 26 is similarly adapted for rigid attachment to a cylindrical opening 28 in the housing 22.

The outer sleeve 26 is characterized by a partially tapered interior surface 30, as illustrated in the top and sectioned side views of FIGS. 3 and 4, respectively. For the purposes of this disclosure, the term "taper" is intended to refer to a gradual, monotonic diminution in cross section or width in an elongated object, such as to create a progressively narrowing toward one end of the object. Accordingly, the geometry of the surface 30 is at least in part frustoconical, with a lower portion 32 being shown as cylindrical. The critical feature of the invention is an interior surface that is uniformly tapered along the longitudinal axis of the sleeve 26. According to a first aspect of the invention embodied in FIGS. 5–7, the inner sleeve 24 has an exterior surface 34 that conforms to the frustoconical geometry of the surface 30, so that the inner sleeve 24 can be seated in perfect concentric alignment within the outer sleeve 26. Accordingly, the objective 10 affixed to the sleeve 24 is similarly aligned with the housing 22 to which the outer sleeve 26 is attached.

In operation, a spring 36 (FIG. 2) is provided to urge the objective 10 and sleeve 24 forward within the housing 22 until firmly seated by the connection between the mating surfaces 30 and 34 of the outer and inner sleeves, respectively. When a force is applied to the forward tip of the objective 10, it retracts against the spring 36 by telescopically sliding backwards within the outer sleeve 26. When the force is released, the spring urges the objective forward, back to its original seated position. The conforming frustoconical surfaces 34, 30 and the resulting mating connection between the two sleeves 24, 26 provide a guide for repositioning the objective that ensures its radial as well as axial alignment with its original position. As is well understood by those skilled in the art, so long as the frustoconical surfaces mate perfectly, the inner sleeve 24 (and the objective 10 with it) can only be seated at a single position, which will necessarily be reproduced with precision whenever the objective is crashed and repositioned by the spring-loaded mechanism.

Obviously, the precision and repeatability of the repositioning procedure depends on the quality of the mating surfaces 30 and 34. In practice, imperfections in either surface can cause misalignments that can be noticeable and significant in interferometric applications. Thus, in order to prevent relative rotation of the two surfaces, a pin 38 connected to the inner sleeve 24 is used to maintain its alignment with reference to the outer sleeve 26 and housing 22. The pin 38 is enclosed in a longitudinal slot 40 in the housing 22 that provides a guide to maintain the radial alignment of the objective. The slot 40 is preferably sufficiently long to allow for the axial displacement caused by the worst-case crash of the objective.

Figure 8:
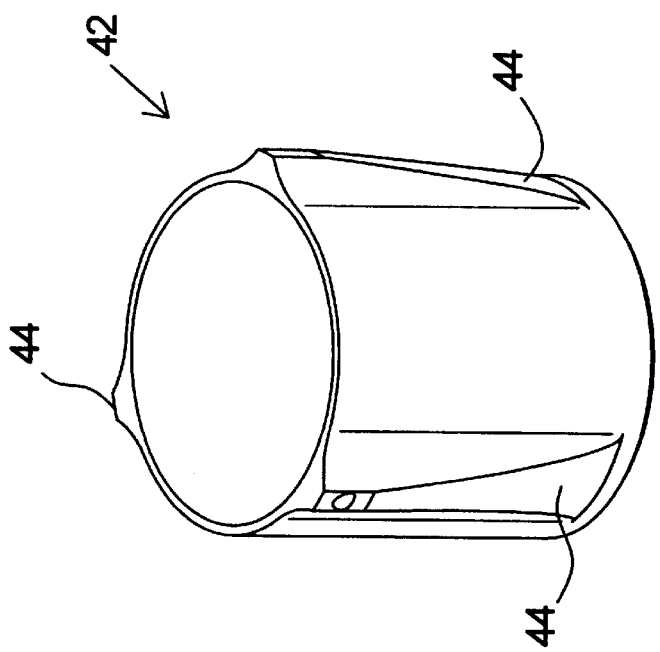
FIG. 8 is a perspective view of the preferred embodiment of an inner sleeve according to the invention.
Figure 9:
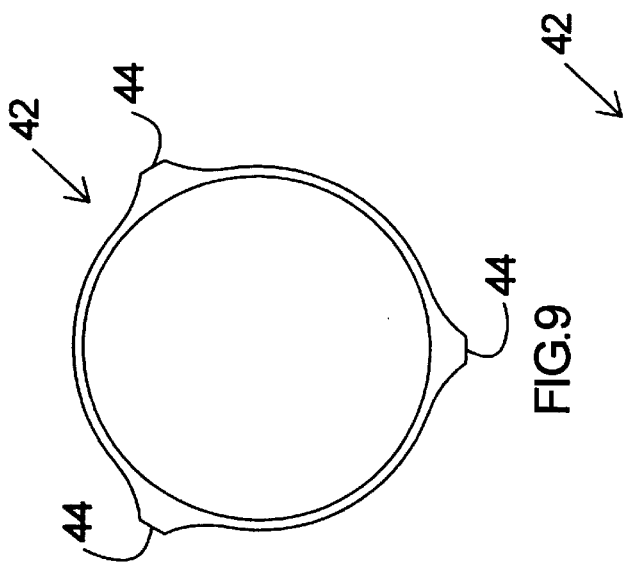
FIG. 9 is a top view of the inner sleeve of FIG. 8.
Figure 10:
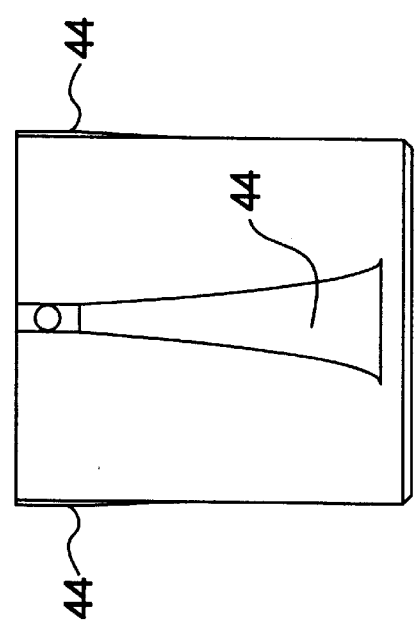
FIG. 10 is an elevational view of the inner sleeve of FIG. 8.

In order to overcome the problem of alignment errors caused by surface imperfections, the preferred embodiment of the invention utilizes a lobed configuration for one of the sleeve surfaces 30, 34. The concept is illustrated in FIGS. 8–10, where a modified inner sleeve 42 has an exterior surface characterized by three longitudinal lobes 44 that consist of sections of the frustoconical geometry of the surface 34. The three lobes are preferably uniformly spaced (120 degrees apart) around the outer perimeter of the sleeve 42, thereby providing three contact surfaces that define a unique seated position of the inner sleeve 42 within the outer sleeve 26. It is well understood that any three portions (or even three points) of the surface 34 of the inner sleeve spread over more than 180 degrees would provide an adequate support for precisely and consistently coupling the inner and outer sleeves of the invention in radial as well as axial alignment. As the same time, misalignments caused by surface imperfections are reduced with the size of the contact areas between the outer sleeve's surface 30 and the portions of the inner sleeve's surface 34 used for alignment. Therefore, the size of the lobes 44 is preferably minimized while retaining sufficient surface for adequately supporting the objective under the load imposed by the spring-loaded mechanism. As seen in FIGS. 8 and 10, the three lobes 44 of this preferred embodiment of the invention have a tapered geometry that provides greater contact at the base of the frustoconical surface 30 (shown in FIG. 10) and progressively diminishing contact toward the top of the sleeves.

Figure 12:
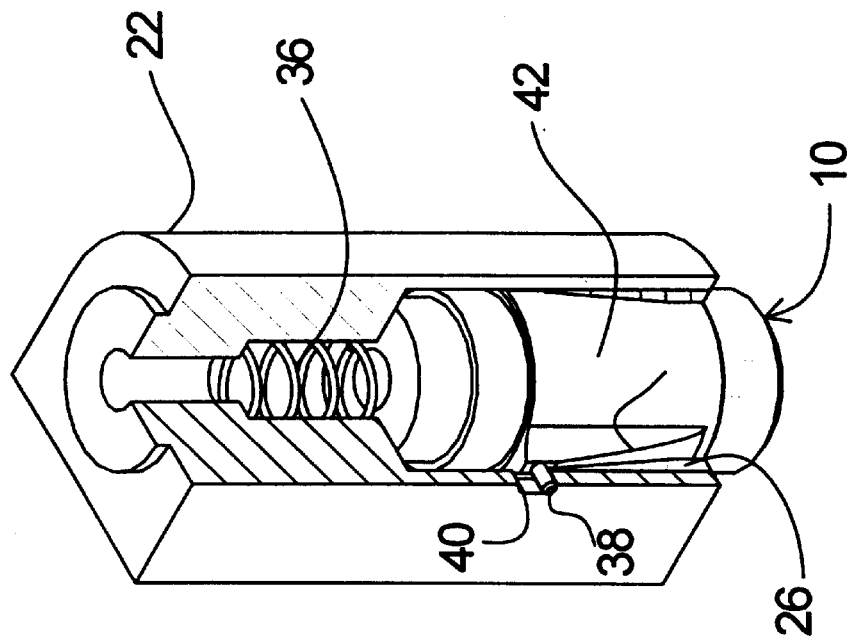
FIG. 12 is a cut-out view of the microscope objective components of FIG. 11 assembled into a working unit according to the preferred embodiment of the invention.
Figure 11:
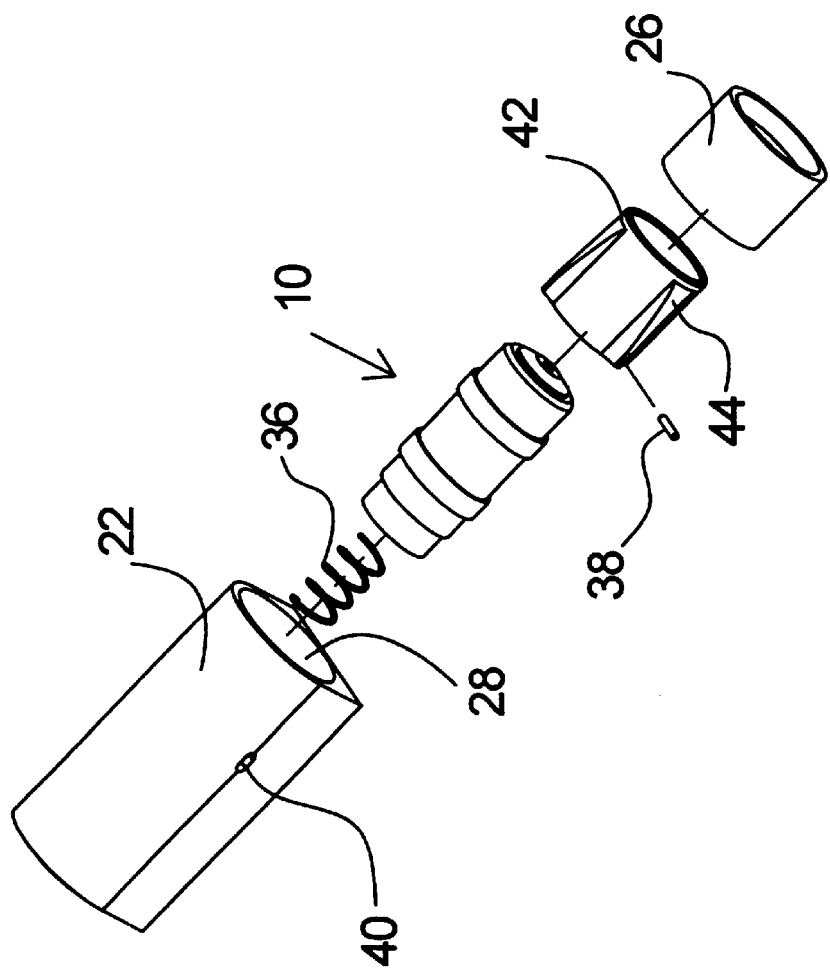
FIG. 11 is an exploded view of a microscope objective including the elements of the preferred embodiment of the invention.
Figure 13:
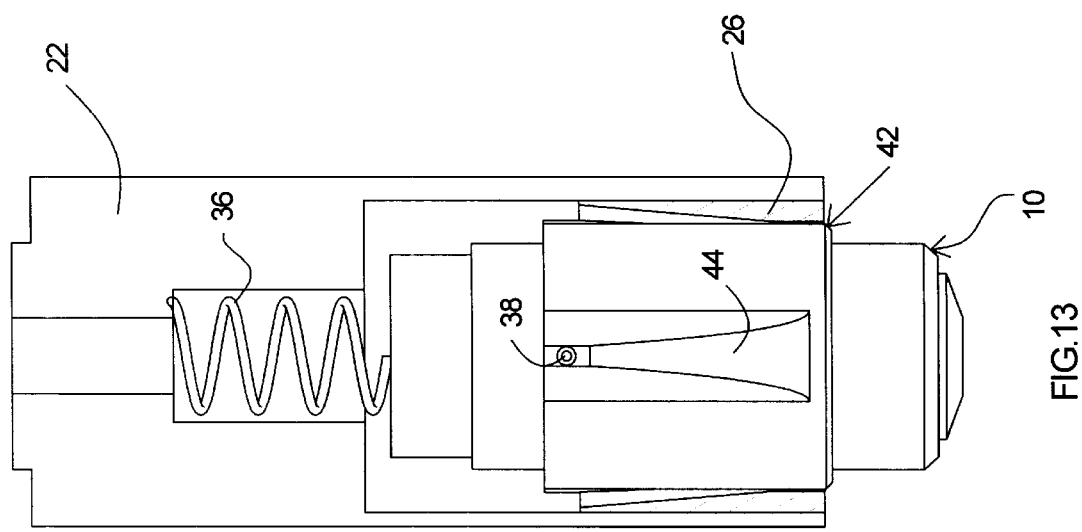
FIG. 13 is an elevational, more detailed view of the components of the invention according to the preferred embodiment.
Figure 14:
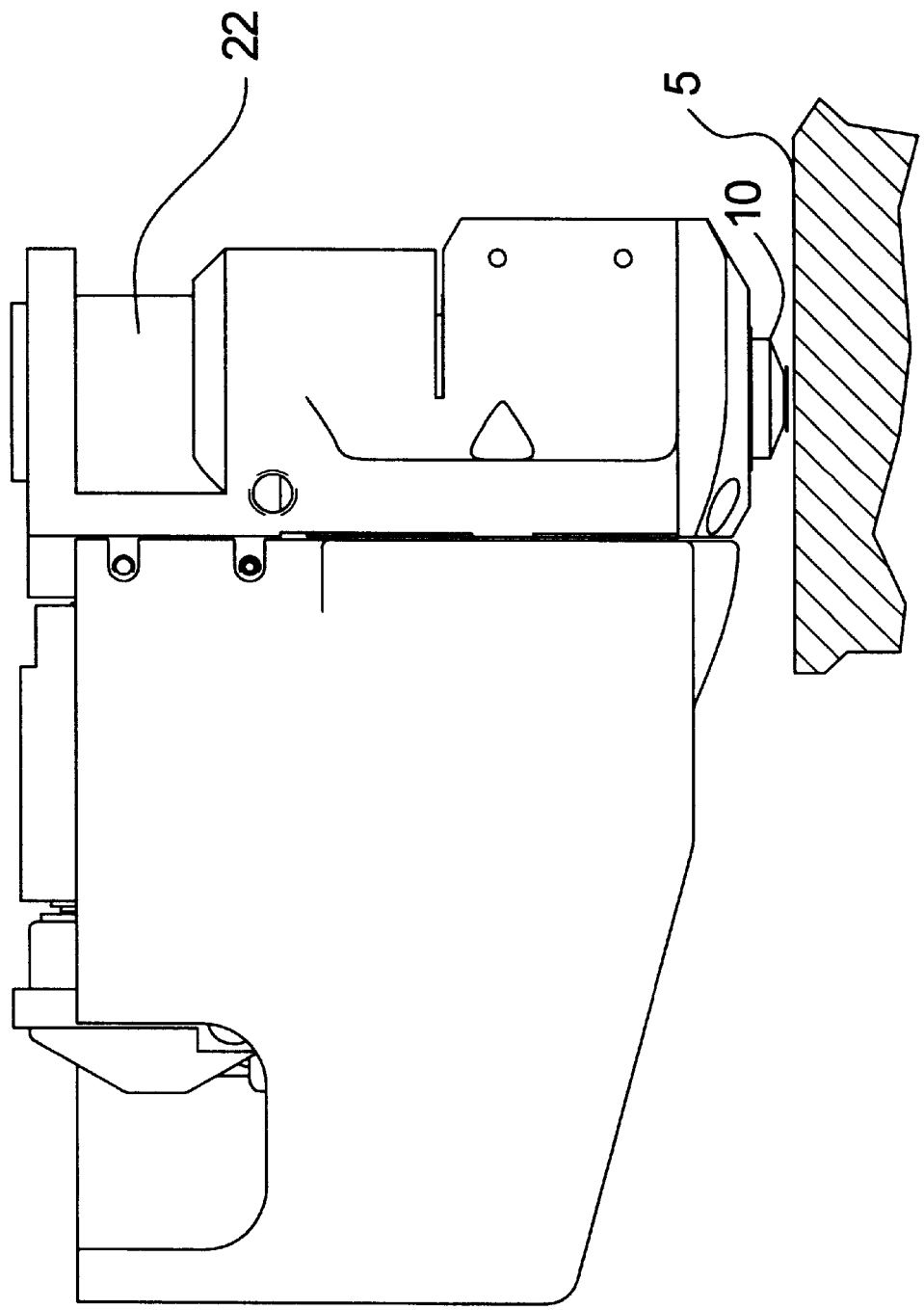
FIG. 14 illustrates the objective of the invention in operation.

An exploded view of the lobed embodiment of the invention is shown in FIG. 11. FIG. 12 is a partially cut out view of the various components after assembly into the housing of a conventional microscope objective. FIG. 13 is a more detailed elevational view of the assembly. Finally, FIG. 14 illustrates the objective in operation in close proximity to a sample surface S.

The invention has been described in terms of mating frustoconical surfaces because they are relatively easy to manufacture with the required degree of precision, but it is clear that any conforming sets of tapered surfaces could be used to practice the invention.

If the taper is too gradual, such as approaching a cylindrical configuration, the inner sleeve may tend to become wedged within the outer sleeve malfunction for crash prevention. On the other hand, too much taper may not provide sufficient axial alignment for the purposes of the invention. Therefore, a proper design must be obtained with these two considerations in mind. We found that a frustoconical geometry with a 2-degree taper (with respect to the longitudinal axis) caused the two sleeves to stick to each other under the load provided by the spring of the spring-loading mechanism. A 5-degree taper was found to provide very good, repeatable alignment without binding.

Figure 17:
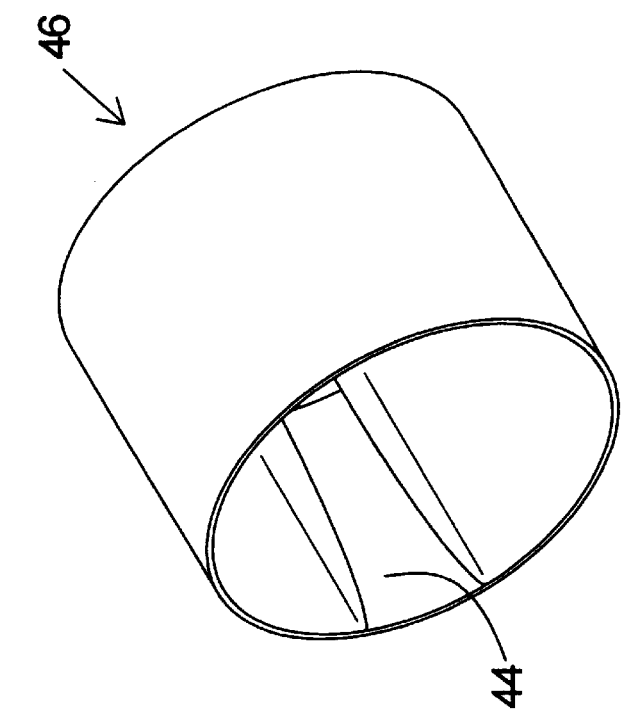
FIG. 17 is a perspective view of the outer sleeve of FIG. 15 seen from its bottom portion.
Figure 15:
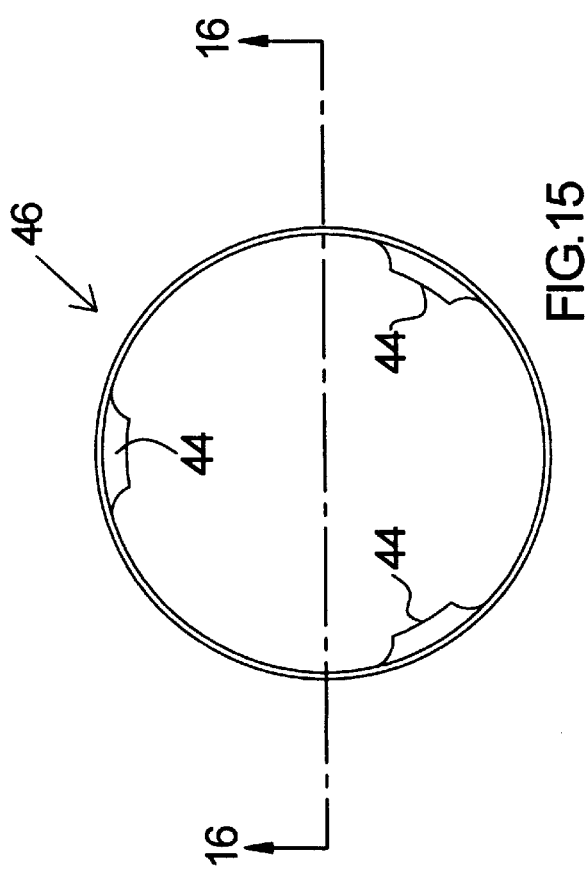
FIG. 15 is a top view of an alternative embodiment of the outer sleeve of the invention.
Figure 16:
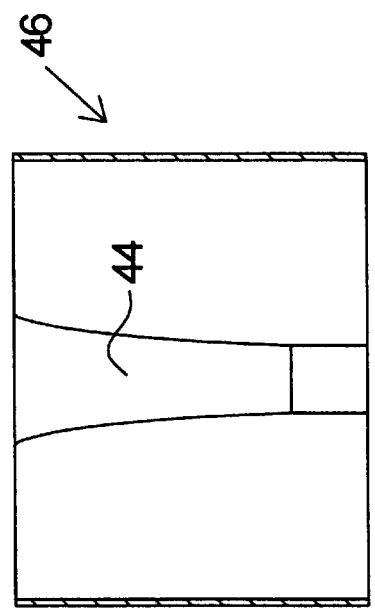
FIG. 16 is a sectioned view of the outer sleeve of FIG. 15 as seen from line 16—16 in that figure.

Various other changes in the details, steps and components that have been described may be made by those skilled in the art within the principles and scope of the invention herein illustrated and defined in the appended claims. For example, the lobes 44 have been described as pertaining to the exterior surface of the inner sleeve, but the invention could equivalently be practiced by having a lobed interior surface of the outer sleeve and a correspondingly frustoconical surface in the inner sleeve. Such an alternative embodiment 46 of the outer sleeve is illustrated in the top, partially sectioned elevational, and perspective views of FIGS. 15, 16 and 17. Of course, the sleeve 46 would be used with the frustoconical inner sleeve 34 of FIGS. 5–7.

Similarly, the invention is not intended to be limited to interferometric objectives. While it provides a particularly useful improvement for Linnik applications, it is clearly also potentially advantageous in other cases. For example, the invention could be used to maintain very precise alignment between objectives mounted on a turret, or in a lateral measurement system where absolute alignment between the objective optical axis and the sample stage is important.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A crash protection mechanism for a microscope objective comprising, in combination:
   (a) an inner sleeve adapted for receiving and retaining the objective, said inner sleeve having a tapered exterior surface;
   (b) an outer sleeve affixed to a housing for said objective; said outer sleeve having a tapered interior surface conforming to said tapered exterior surface of the inner sleeve for mating connection therewith; and
   (c) means for urging the inner sleeve to a seated position in the outer sleeve corresponding to said mating connection of the tapered exterior surface of the inner sleeve with the tapered interior surface of the outer sleeve.

2. The mechanism of claim 1, wherein said interior surface of the outer sleeve has a frustoconical shape.

3. The mechanism of claim 1, wherein said urging means includes a spring.

4. The mechanism of claim 3, wherein said spring acts on the objective.

5. The mechanism of claim 1, wherein said exterior surface of the inner sleeve includes at least three lobed sections conforming to said tapered interior surface of the outer sleeve for mating connection therewith.

6. The mechanism of claim 1, wherein said interior surface of the outer sleeve includes at least three lobed sections conforming to said tapered exterior surface of the inner sleeve for mating connection therewith.

7. The mechanism of claim 1, wherein said objective is an interferometric objective.

8. A method for protecting a microscope objective from damage caused by contact with a sample surface, comprising the following steps:
   (a) affixing an outer sleeve to a housing for said objective, said outer sleeve having a tapered interior surface;
   (b) affixing the objective to an inner sleeve having a tapered exterior surface conforming to said tapered interior surface of the outer sleeve for mating connection therewith;
   (c) installing the objective into the housing through a telescopic coupling between the inner and outer sleeves; and
   (d) urging the inner sleeve to a seated position in the outer sleeve corresponding to said mating connection of the tapered exterior surface of the inner sleeve with the tapered interior surface of the outer sleeve;
   such that the objective is able to retract in response to an axial force applied by the sample surface and return to said seated position when the force is removed.

9. The method of claim 8, wherein said interior surface of the outer sleeve has a frustoconical shape.

10. The method of claim 8, wherein said urging step includes the use of a spring.

11. The method of claim 10, wherein said spring acts on the objective.

12. The method of claim 8, wherein said exterior surface of the inner sleeve includes at least three lobed sections conforming to said tapered interior surface of the outer sleeve for mating connection therewith.

13. The method of claim 8, wherein said interior surface of the outer sleeve includes at least three lobed sections conforming to said tapered exterior surface of the inner sleeve for mating connection therewith.

14. The method of claim 8, wherein said objective is an interferometric objective.

* * * * *